UNITED STATES PATENT OFFICE.

IDA WORRILL, OF BOSTON, GEORGIA.

PROCESS OF PURIFYING BUTTER.

1,045,926.

Specification of Letters Patent.

Patented Dec. 3, 1912.

No Drawing.

Application filed April 4, 1911. Serial No. 618,840.

*To all whom it may concern:*

Be it known that I, IDA WORRILL, a citizen of the United States, residing at Boston, in the county of Thomas and State of Georgia, have invented a new and useful Process of Purifying Butter, of which the following is a specification.

This invention relates to a process of treating butter, whereby to render it possible to keep the resulting product in sweet condition for an indefinite period, and to accomplish the result without the addition to the butter of any substance that would be deleterious, or in the least nullify any of its health-giving properties.

With the above and other objects in view, as will appear as the nature of the invention is better understood, the same consists in the novel process of treating butter, hereinafter fully described and claimed.

In carrying the invention into effect, the butter is placed in an open vessel, preferably of porcelain or of enamel ware, and this is arranged in the center of a boiler through which passes a current of steam from one side to the other, a cover being employed to prevent the escape of the steam and to concentrate its heat. After the butter has remained in the boiler or steamer for from sixty to eighty minutes at a temperature not exceeding 213° F., perfect melting without boiling takes place. During this melting, the lactic acid, salt water and casein are liberated and sink to the bottom of the vessel, while the butyric acid escapes in the form of vapor, with the result that no appreciable amount of the acid remains. The other acids and constituents necessary to the product remain in the butter-fat, which is the product of the procedure. When the butter-fat has thus been produced, the vessel containing it is removed from the steamer and subjected to a lower temperature, say about 70° F., for from six to eight hours, and this will cause the perfect crystallization of the butter-fat, after which it is very carefully removed and placed in another vessel that is perfectly clean, and should any dregs adhere to the butter-fat, they may be rinsed off with pure water and the butter-fat dried with a clean towel. The butter-fat must now be stirred carefully until the whole is a smooth mass, and this usually ensues in from five to ten minutes. For present use the butter-fat may be molded into forms, but if it is to be kept for an indefinite period, it is placed in stone or glass jars and covered to keep out the dust. Butter-fat treated in this manner requires no cold storage, as those constituents which tend to make it rancid are removed. By preference, all of the vessels employed in carrying out the process are of enameled ware. If desired, the dregs remaining from the above treatment may also be purified and used for making bread, so that no loss may occur.

The process may be carried out by any housewife of ordinary intelligence, and will require no expensive apparatus for the purpose.

I claim:—

The herein described method of purifying butter which consists in subjecting the same to the action of steam in a closed vessel, at a temperature not exceeding 213° F., until perfect melting without boiling takes place, thereby causing the salt water, casein and lactic acid to sink to the bottom of the vessel while the butyric acid escapes in the form of a vapor, then removing the resulting purified butter-fat and allowing it to remain in a lower temperature, approximately 70° F., until perfect crystallization ensues, and then carefully stirring the mass until the whole is perfectly smooth.

In testimony that I claim the foregoing as my own, I have hereto affixed my signature in the presence of two witnesses.

IDA WORRILL.

Witnesses:
S. L. ROGERS,
J. A. HORN.